United States Patent Office 3,135,759
Patented June 2, 1964

3,135,759
MANUFACTURE OF ORGANIC CHEMICAL
COMPOUNDS
Norman Whittaker, London, England, assignor to Burroughs Wellcome & Co. (U.S.A.), Inc., Tuckahoe, N.Y., a corporation of New York
No Drawing. Filed Mar. 14, 1961, Ser. No. 95,512
Claims priority, application Great Britain Mar. 18, 1960
14 Claims. (Cl. 260—288)

This invention relates to the manufacture of 3,4-dihydroisoquinolines.

3,4-dihydroisoquinolines have usually been made by heating an N-acylphenethylamine bearing the desired substituent groups with a dehydrating agent, but this reaction does not always give good yields, particularly in making a 1-unsubstituted 3,4-dihydroisoquinoline from an N-formylphenethylamine. Compounds containing the isoquinoline ring system may also be made by heating a phenethylamine with a slight excess of an aldehyde under acid conditions to give a 1,2,3,4-tetrahydroisoquinoline, and by using formaldehyde 1-unsubstituted 1,2,3,4-tetrahydroisoquinolines can be easily prepared. There are, however, no convenient general methods known for partially dehydrogenating a 1,2,3,4-tetrahydroisoquinoline to give a 3,4-dihydroisoquinoline.

According to the present invention, 3,4-dihydroisoquinolines of Formula I can be obtained by treating the corresponding 1,2,3,4-tetrahydroisoquinoline of Formula II with an N-halogenating agent and subsequently heating with alkali.

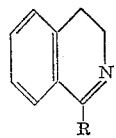

(I)

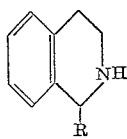

(II)

In these formulae R is a hydrogen atom or an alkyl or indifferently substituted alkyl group (the substituents if any not taking part in the reaction with the N-halogenating agent) and the benzenoid ring may be substituted with one or more alkoxy groups or an alkylenedioxy group. N-halogenating agents suitable for use in this method include hypochlorites, hypobromites and N-chloroamides such as N-chloro-succinimide and sodio-N-chloro-p-toluenesulphonamide (chloroamine-T). A concentrated aqueous solution of sodium hypochlorite is convenient.

3,4-dihydroisoquinolines of Formula III, which may be made by the method of this invention from 1,2,3,4-tetrahydroisoquinolines of Formula IV, are valuable intermediates in the manufacture of pharmacologically active 1,2,3,4,6,7 - hexahydro - 2 - oxo - 11b - benzo(a) - quinolizines (such as 3-ethyl- or 3-isobutyl-1,2,3,4,6,7-hexahydro-9,10-dimethoxy-2-oxo-11b - benzo(a)quinolizine) by the method described in U.S. application 141,581, and in the manufacture of emetine, 2-dehydroemetine and other analogues of emetine by the methods described in U.S. applications 71,046 and 71,045 (in conjunction with U.S. application 141,581), and in French patent specification 1,268,653.

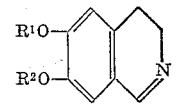

(III)

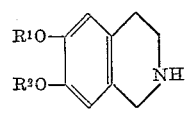

(IV)

In these formulae, $R^1$ and $R^2$ are methyl or ethyl groups or together form a methylene group. The syntheses of emetine and 2-dehydroemetine require 3,4-dihydro-6,7-dimethoxyisoquinoline, which is readily made by the method of this invention from 1,2,3,4-tetrahydro-6,7-dimethoxyisoquinoline.

The method of this invention may be applied in circumstances where the group R in Formulae I and II is a 1,2,3,4,6,7-hexahydro- or 1,4,6,7-tetrahydro-11b-benzo(a) quinolinizin-2-ylmethyl radical. Such compounds of Formula II may conveniently be made by reducing a corresponding compound of Formula I obtainable from other sources. This reduction, however, gives two isomeric products of Formula II differing in their configuration at the point of attachment of the group R to the isoquinoline ring. The present invention provides a method for converting an unwanted isomer of Formula II back into the compound of Formula I without disturbing the structure of the rest of the molecule.

Thus, a feature of this invention is its application to the production of emetine (V), an established drug in the treatment of amoebiasis, and of 2-dehydroemetine (VI), said to be an effective amoebicide.

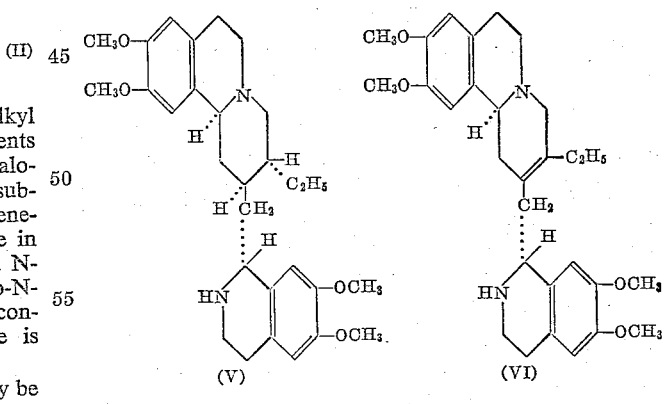

(V)    (VI)

These compounds are conveniently made by reducing O-methylpsychotrine (VII) or 2-dehydro-O-methylpsychotrine (VIII), but a part of the product of this reduction is the undesired isoemetine (IX) or 2-dehydroisoemetine (X) respectively. The latter compounds are valueless as amoebicides.

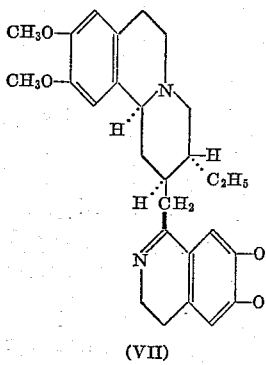
(VII)

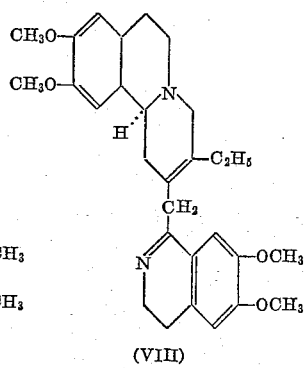
(VIII)

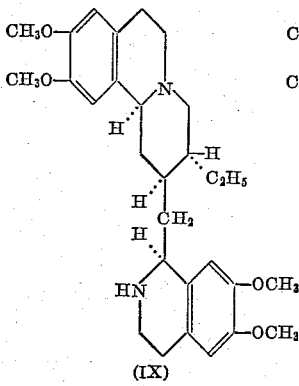
(IX)

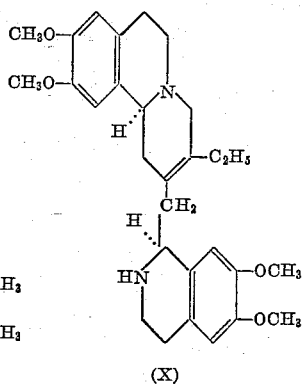
(X)

This invention provides a method for converting in good yield isoemetine (IX) or 2-dehydroisoemetine (X) into O-methylpsychotrine (VII) or 2-dehydro-O-methylpsychotrine (VIII) respectively, which may then be reduced to give further quantities of emetine (V) or 2-dehydroemetine (VI). The method is characterised in that isoemetine or 2-dehydroisoemetine is treated with an N-halogenating agent and subsequently heated with alkali.

The method of this invention similarly converts emetine or 2-dehydroemetine into O-methylpsychotrine or 2-dehydro-O-methylpsychotrine respectively. It is therefore possible to convert a mixture of both the desired and undesired reduced isomers, such as may be obtained from the mother liquors after crystallisation of the desired isomer, almost entirely back to O-methylpsychotrine or 2-dehydro-O-methylpsychotrine, which can then be reduced once more.

The following examples illustrate the invention. The temperatures are in degrees Celsius.

Example 1

1,2,3,4 - tetrahydro - 6,7 - dimethoxyisoquinoline hydrochloride (310 g.) was shaken with chloroform (500 ml.) and a solution of potassium hydroxide (100 g.) in water (2000 ml.) until the crystals had dissolved. The chloroform solution was separated, and the aqueous layer was extracted with more chloroform (500 ml.). The chloroform solutions were washed ($H_2O$), combined, and evaporated in vacuo, and the residual based was freed from tracers of chloroform by dissolving in methanol (1000 ml.) and evaporating the solution in vacuo. When a stirred solution of the base in methanol (5000 ml.) was treated with 1.90 molar aqueous sodium hypochlorite (710 ml.) during ca. 5 minutes, an exothermic reaction took place, and sodium chloride separated from the solution. The reaction mixture was set aside for 1 hour, treated with sodium hydroxide pellets (500 g.), refluxed for 45 minutes, cooled slightly, and diluted with water (3000 ml.). The methanol was evaporated in vacuo, leaving an aqueous suspension of oil which was extracted with chloroform (500 ml.×2). The chloroform extract was washed ($H_2O$), dried ($Na_2SO_4$) and evaporated, and the residual oil was freed from traces of chloroform by distilling with ether. A solution of the oil in ether (750 ml.) was treated cautiously with an excess of powdered solid carbon dioxide, filtered from 1,2,3,4-tetrahydro-6,7-dimethoxyisoquinoline carbonate (14.9 g.), and evaporated. The residual oil was finally heated on the steambath under water-pump vacuum, and using a cold (−70°) trap to eliminate traces of ether, to give 242 g. of 3,4-dihydro-6,7-dimethoxyisoquinoline.

Example 2

1,2,3,4 - tetrahydro - 6,7 - dimethoxy - 1 - methylisoquinoline hydrochloride (12.18 g.) was dissolved in water, and the solution made alkaline by the addition of aqueous sodium hydroxide and extracted with ethyl acetate. The extract was dried over potassium carbonate and evaporated, and the residual base (10.3 g.) was dissolved in methanol (125 ml.) and treated dropwise, with stirring and water-cooling, with aqueous sodium hypochlorite (26 ml. of 1.93 molar). The addition took 15 minutes, and after a further 45 minutes stirring, the mixture was treated with sodium hydroxide pellets (25 g.) and stirred without cooling until solution of the alkali was complete. It was kept overnight at room temperature, and the methanol was then distilled off from the steam bath during 1½ hours. Water (100 ml.) was added and a further quantity of methanol was removed by evaporation under reduced pressure, when an oil separated from solution, and was extracted with chloroform. The chloroform solution was extracted with successive portions (30 ml., 15 ml., 10 ml.) of 2N-hydrochloric acid, and the extracts were made alkaline and extracted with ether, yielding on evaporation of the ether a crude base (9.5 g.) which rapidly solidified. Crystallisation from ether gave pure 3,4 - dihydro - 6,7 - dimethoxy-1-methylisoquinoline, M.P. 101–102°.

Example 3

A solution of 1,2,3,4-tetrahydroisoquinoline (26.6 g.) in methanol (500 ml.) was stirred and cooled in ice-water whilst aqueous sodium hypochlorite (104 ml. of 1.93 molar) was added dropwise during the course of 1 hour. A mildly exothermic reaction took place and sodium chloride was precipitated. After being kept overnight at room temperature, the mixture was treated with sodium hydroxide pellets (50 g.), stirred, and heated under reflux for 45 minutes. The methanol was then distilled off from the steam-bath, and the oily base which separated was extracted from the cooled mixture with ether, after addition of sufficient water to dissolve the sodium chloride. The ethereal extract was treated with excess of powdered solid carbon dioxide, the precipitated carbonate was removed by filtration, and the filtrate was evaporated and distilled, giving 3,4-dihydroisoquinoline as a colourless liquid, B.P. 100–104°/12 mm. (17.0 g.) which on treatment with alcoholic picric acid gave a sparingly-soluble picrate, M.P. 172–174°, raised to 176–177° by crystallisation from acetone-ethanol.

Example 4

A stirred solution of isoemetine hydrate (0.5 g.) in methanol (3 ml.) was treated with N-chlorosuccinimide (0.134 g.), and set aside at room temperature for 10 minutes. A solution of sodium (0.31 g.) in methanol (9 ml.) was then added, and the mixture was refluxed for 45 minutes. The resulting suspension of sodium chloride was cooled, and diluted with water, the methanol was evaporated in vacuo and the gummy product was extracted with chloroform. The extract was washed with water, dried over anhydrous sodium sulphate, evaporated, and the residual gum was dissolved in alcohol. The alcoholic solution was evaporated, the residual gum was dissolved in hot alcohol (20 ml.) and then treated with a slight excess of a concentrated alcoholic solution of oxalic acid dihydrate. Crystals of hydrated (+)-O-methylpsychotrine di-hydrogen oxalate separated immediately and, after cooling, were collected and washed with alcohol. The product (0.67 g.; 92%) had melting point 157–159° (efferv.) and $[\alpha]_D^{21} = +40°$ ($c=2$ in $H_2O$).

*Example 5*

Chloramine-T (0.283 g.) was added to a stirred solution of isoemetine hydrate (0.5 g.) in methanol (3 ml.). After 75 minutes at room temperature the resulting solution of N-chloroisoemetine was treated with a solution of sodium (0.31 g.) in methanol (9 ml.) and worked up in the manner of Example 4, giving (+)-O-methylpsychotrine di-hydrogen oxalate of melting point 157–159° (efferv.).

*Example 6*

Dichloramine-T (0.133 g.) was reacted with isoemetine hydrate (0.5 g.) in the manner of Example 5, giving hydrated (+)-O-methylpsychotrine di-hydrogen oxalate (0.53 g.; 74%) of melting point 159–161° (efferv.) and $[\alpha]_D^{26} = +41°$ ($c=2$ in $H_2O$).

*Example 7*

N-chloroacetamide (0.094 g.) was reacted with isoemetine hydrate (0.5 g.) in the manner of Example 5, giving (+)-O-methylpsychotrine di-hydrogen oxalate of melting point 157–159° (efferv.).

*Example 8*

Ice-cold aqueous sodium hypochlorite (2.06 molar, 0.49 ml.) was added dropwise to a stirred solution of isoemetine hydrate (0.5 g.) in methanol (4 ml.), and the mixture was set aside at room temperature for 15 minutes. A solution of sodium (0.31 g.) in methanol (8 ml.) was added, and the mixture was refluxed for 45 minutes, then worked up in the manner of Example 4, giving hydrated (+)-O-methylpsychotrine di-hydrogen oxalate (0.66 g.; 91%) of melting point 161–162° (efferv.) and $[\alpha]_D^{25} = +40.5°$ ($c=2$ in $H_2O$).

*Example 9*

A solution of emetine base (from 0.717 g. of emetine dihydrobromide tetrahydrate) in methanol (4 ml.) was reacted with the amounts of aqueous sodium hypochlorite and methanolic sodium methoxide used in Example 8. The derived hydrated (+)-O-methylpsychotrine di-hydrogen oxalate (0.62 g.; 86%) had melting point 161–162° (efferv.) and $[\alpha]_D^{25} = +41.5°$ ($c=2$ in $H_2O$).

*Example 10*

When a solution of isoemetine hydrate (0.5 g.) in methanol (4 ml.) was treated with ice-cold aqueous sodium hypobromite (1.725 molar, 0.58 ml.), and then with methanolic sodium methoxide, in the manner of Example 8, (+)-O-methylpsychotrine di-hydrogen oxalate of melting point 157–159° (efferv.) was again obtained.

*Example 11*

A solution of iodine (0.255 g.) in methanol (3.5 ml.) was added dropwise, during 5 minutes, to an ice-cooled, stirred solution of isoemetine hydrate (0.5 g.) in methanol (4 ml.) containing aqueous potassium hydroxide (10% w./v., 1.7 ml.). The cooling bath was removed, and the stirred suspension set aside for 35 minutes. The resulting solution was treated with a solution of sodium (0.31 g.) in methanol (5 ml.), refluxed for 45 minutes, and then worked up in the manner of Example 4, giving (+)-O-methylpsychotrine di-hydrogen oxalate.

*Example 12*

A solution of racemic 2-dehydroisoemetine base (from 1 g. of racemic 2-dehydroisoemetine dihydrochloride tetrahydrate) in methanol (8 ml.) was treated with 1.85 molar aqueous sodium hypochlorite (0.87 ml.) and set aside at room temperature for 30 minutes. The mixture was treated with sodium hydroxide pellets (1 g.), refluxed for 1 hour under nitrogen, diluted with water, and the methanol was evaporated in vacuo. The residual aqueous suspension of oil was extracted with chloroform, and the extract was washed ($H_2O$), dried ($Na_2SO_4$), and evaporated. A solution of the residual gum in methanol was acidified with concentrated aqueous hydrochloric acid and evaporated in vacuo. When the residue was dissolved in methanol, and treated with just sufficient ether to produce turbidity, almost colourless crystals of hydrated racemic 2 - dehydro - O - methylpsychotrine dihydrochloride separated. Recrystallisation from methanol afforded colourless prisms of this product, M.P. 183–186° (with effervescence and red coluration). A sample, dissolved in water and treated with aqueous ammonia, yielded crystals of the readily oxidised racemic 2-dehydro-O-methylpsychotrine, M.P. 104–106°.

I claim:

1. A method for the manufacture of a 3,4-dihydroisoquinoline of the formula

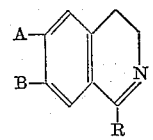

comprising treating the corresponding 1,2,3,4-tetrahydroisoquinoline of the formula

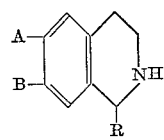

with an N-halogenating agent selected from the class consisting of the hypochlorites, the hypobromites, the N-chloroamides, and the N-chloroimides and subsequently heating with alkali; in these formulae, R is selected from the class consisting of the hydrogen atom and the lower alkyl, the 3-ethyl-1,2,3,4,6,7-hexahydro-9,10-dimethoxy-11b-benzo(a)-quinolizin-2-ylmethyl and the 3-ethyl-1,4,6,7 - tetrahydro - 9,10-dimethoxy-11b-benzo(a)quinolizin-2-ylmethyl radicals, and A and B separately are each selected from the class consisting of the hydrogen atom and the methoxy and ethoxy groups and together form the methylenedioxy group.

2. A method claimed in claim 1 in which the N-halogenating agent used is a solution containing the hypochlorite anion.

3. A method claimed in claim 1 in which the N-chlorinating agent is an N-chloroamide.

4. A method claimed in claim 1 in which the N-chlorinating agent is an N-chloroimide.

5. A method for the manufacture of a 3,4-dihydroisoquinoline of the formula

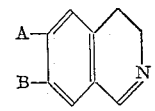

comprising treating the corresponding 1,2,3,4-tetrahydroisoquinoline of the formula

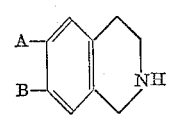

with an N-halogenating agent selected from the class consisting of the hypochlorites, the hypobromites, the N-chloroamides, and the N-chloroimides and subsequently heating with alkali; in these formulae, A and B separately are each selected from the class consisting of the hydrogen atom and the methoxy and ethoxy groups and together form the methyleneidoxy group.

6. A method claimed in claim 5 in which the N-halogenating agent used is a solution containing the hypochlorite anion.

7. A method for the manufacture of 3,4-dihydro-6,7-dimethoxyisoquinoline comprising treating 1,2,3,4-tetrahydro-6,7-dimethoxyisoquinoline with an N-halogenating agent selected from the class consisting of the hypochlorites, the hypobromites, the N-chloroamides, and the N-chloroimides and subsequently heating with alkali.

8. A method claimed in claim 7 in which the N-halogenating agent used is a solution containing the hypochlorite anion.

9. A method for the manufacture of O-methylpsychotrine comprising treating isoemetine with an N-halogenating agent selected from the class consisting of the hypochlorites, the hypobromites, the N-chloroamides, and the N-chloroimides and subsequently heating with alkali.

10. A method claimed in claim 9 in which the N-halogenating agent used is a solution containing the hypochlorite anion.

11. A method claimed in claim 9 in which the N-chlorinating agent is an N-chloroamide.

12. A method claimed in claim 9 in which the N-chlorinating agent is an N-chloroimide.

13. A method for the manufacture of 2-dehydro-O-methylpsychotrine comprising treating 2-dehydroisoemetine with an N-halogenating agent selected from the class consisting of the hypochlorites, the hypobromites, the N-chloroamides, and the N-chloroimides and subsequently heating with alkali.

14. A method claimed in claim 13 in which the N-halogenating agent used is a solution containing the hypochlorite anion.

References Cited in the file of this patent

UNITED STATES PATENTS 2,666,068    Hanze et al. _____ Jan. 12, 1954

FOREIGN PATENTS 798,847    Great Britain _____ July 30, 1958

OTHER REFERENCES

Karrer et al.: Helv. Chim. Acta, vol. 31, 1219–28, 1948.
Potter et al.: Jour. of Chem. Soc., 1953, pp. 1320–21.
Bican-Fister: Chem. Abstr., vol 54, No. 4, p. 3475g, Feb. 25, 1960.